US009627843B2

(12) United States Patent
Zhang et al.

(10) Patent No.: US 9,627,843 B2
(45) Date of Patent: Apr. 18, 2017

(54) METHOD AND LASER PULSE SOURCE APPARATUS FOR GENERATING FS LASER PULSES (71) Applicants: Max-Planck-Gesellschaft zur Foerderung der Wissenschaften e.V., Munich (DE); Ludwig-Maximilians-Universitaet Muenchen, Munich (DE)

(72) Inventors: Jinwei Zhang, Garching (DE); Oleg Pronin, Garching (DE); Jonathan Brons, Unterschleissheim (DE)

(73) Assignees: Max-Planck-Gesellschaft zur Foerderung der Wissenschaften e.V., Munich (DE); Ludwig-Maximilians-Universitaet Muenchen, Munich (DE)

( * ) Notice: Subject to any disclaimer, the term of this patent is extended or adjusted under 35 U.S.C. 154(b) by 0 days.

(21) Appl. No.: 15/146,546

(22) Filed: May 4, 2016

(65) Prior Publication Data
US 2016/0329677 A1 Nov. 10, 2016

(30) Foreign Application Priority Data

May 5, 2015 (EP) ..................................... 15001331

(51) Int. Cl.
*H01S 3/10* (2006.01)
*H01S 3/109* (2006.01)
(Continued)

(52) U.S. Cl.
CPC .......... *H01S 3/1095* (2013.01); *H01S 3/0604* (2013.01); *H01S 3/081* (2013.01);
(Continued)

(58) Field of Classification Search
CPC ...... H01S 3/1095; H01S 3/0604; H01S 3/081; H01S 3/0813; H01S 3/1068;
(Continued)

(56) References Cited

U.S. PATENT DOCUMENTS 6,834,064 B1    12/2004  Paschotta et al.
2014/0286364 A1  9/2014  Pronin et al.

FOREIGN PATENT DOCUMENTS

DE    60034589 T2    12/2007

OTHER PUBLICATIONS

Brons et al.: "Energy scaling of Kerr-lens mode-locked thin-disk oscillators", Optics Letters vol. 39, No. 22, pp. 6442-6445 (2014).
(Continued)

*Primary Examiner* — Armando Rodriguez
(74) *Attorney, Agent, or Firm* — Caesar Rivise, PC (57) ABSTRACT A method of generating fs laser pulses (1), includes steps of creating a circulating light field in a resonator cavity (10) with multiple resonator mirrors (11-18) by pumping at least one gain medium (21, 22) included in the resonator cavity (10), and passing the circulating light field through a first Kerr medium (31) included in the resonator cavity (10), so that the fs laser pulses (1) are formed by self-amplitude modulation of the circulating light field, wherein the resonator cavity (10) includes at least one supplementary Kerr medium (32-36) enhancing the self-amplitude modulation of the circulating light field, and each of the first Kerr medium (31) and the at least one supplementary Kerr medium (32-36) provide different non-linear Kerr lens contributions to the self-amplitude modulation of the circulating light field. Laser pulse source apparatus (100) for generating fs laser pulses (1) is also described.

20 Claims, 3 Drawing Sheets (51) Int. Cl.
| | |
|---|---|
| *H01S 3/11* | (2006.01) |
| *H01S 3/06* | (2006.01) |
| *H01S 3/106* | (2006.01) |
| *H01S 3/08* | (2006.01) |
| *H01S 3/081* | (2006.01) |
| *H01S 3/16* | (2006.01) |

(52) U.S. Cl.
CPC .......... *H01S 3/0813* (2013.01); *H01S 3/1068* (2013.01); *H01S 3/1112* (2013.01); *H01S 3/1643* (2013.01); *H01S 3/0805* (2013.01); *H01S 3/0811* (2013.01); *H01S 3/1618* (2013.01)

(58) Field of Classification Search
CPC .... H01S 3/1112; H01S 3/1643; H01S 3/0805; H01S 3/0811; H01S 3/1618
See application file for complete search history.

(56) References Cited

OTHER PUBLICATIONS

Brunner et al.: "240-fs pulses with 22-W average power from a mode-locked thin-disk Yb:KY(WO4)2 laser" in Opt. Lett. 27, 1162-1164 (2002).

Ell et al.: "Generation of 5-fs pulses and octave-spanning spectra directly from a Ti:sapphire laser", Optics Letters, Optical Society of America, US, vol. 26, No. 6, pp. 373-375 (2001).

Haus et al.: "Structures for additive pulse mode locking", J. Opt. Soc. Am. B/vol. 8, No. 10/Oct. 1991, pp. 2068-2076 (1991).

Kalashnikov: "Chirped-Pulse Oscillators: Route to the Energy-Scalable Femtosecond Pulses" in Solid State Laser, P. A. Al-Khursan, ed. (InTech, 2012).

Keller et al.: "Semiconductor Saturable Absorber Mirrors (SESAM's) for Femtosecond to Nanosecond Pulse Generation in Solid-State Lasers" in Selected Topics in Quantum Electronics, IEEE Journal of 2, 435-453 (1996).

Mak et al.: "Compressing μJ-level pulses from 250 fs to sub-10 fs at 38-MHz repetition rate using two gas-filled hollow-core photonic crystal fiber stages", Optics Letters vol. 40, No. 7, pp. 1238-1241 (2015).

Matsubara et al.: "Efficient broadband-spectrum oscillation of ultrashort-pulse Kerr-lens mode-locked Yb:YAG laser with intracavity nonlinear media overcoming the fluorescence spectrum limit" in Conference on Lasers and Electro-Optics/International Quantum Electronics Conference, OSA Technical Digest (CD) (Optical Society of America, 2009).

Matsubara et al.: "Efficient ultrashort-pulse generation overcoming the limit of fluorescence spectrum of the gain material" in Frontiers in Optics 2008/Laser Science XXIV/Plasmonics and Metamaterials/Optical Fabrication and Testing, OSA Technical Digest (CD) (Optical Society of America, 2008).

Matsubara et al.: "Generation of 65-fs ultrashort pulses at 1030-nm center wavelength directly from Kerr-lens mode-locked Yb:YAG laser" in Conference on Lasers and Electro-Optics 2010, OSA Technical Digest (CD) (Optical Society of America, 2010).

Moulton et al.: "Spectroscopic and laser characteristics of Ti:Al2O3" in J. Opt. Soc. Am. B 3, pp. 125-133 (1986).

Pronin et a: "High-power Kerr-lens mode-locked thin-disk oscillator in the anomalous and normal dispersion regimes", Proceedings of SPIE, vol. 8599, p. 85991N (2013).

Pronin et al.: "High-power multi-megahertz source of waveform-stabilized few-cycle light", Nature Communications, 6:6998 (2015).

Radzewicz et al.: "Use of ZnS as an additional highly nonlinear intracavity self-focusing element in a Ti:sapphire self-modelocked laser", Optics Communications 102, pp. 464-468 (1993).

Sasatani et al.: "Ultrashort-pulse generation close to the fluorescence spectrum limit of the gain material in mode-locked Yb:YAG laser with semiconductor saturable absorber mirror" in International Journal of Latest Research in Science and Technology 1, 2 (2012).

Schriber et al.: "Dual-gain SESAM modelocked thin disk laser based on Yb:Lu2O3 and Yb:Sc2O3", Optics Express 22, vol. 22, No. 16, pp. 18979-18986 (2014).

Spence et al.: "60-fsec pulse generation from a self-mode-locked Ti:sapphire laser", Optics Letters 16, pp. 42-44 (1991).

Suedmeyer et al.: "Femtosecond laser oscillators for high-field science", Nature Photonics, vol. 2, pp. 599-604 (2008).

Tokurakawa et al.: "Diode-pumped 65 fs Kerr-lens mode-locked Yb3+:Lu2O3 and nondoped Y2O3 combined ceramic laser", Optics Letters, vol. 33, No. 12, pp. 1380-1382 (2008).

Uemura et al.: "Sub-40-fs Pulses from a Diode-Pumped Kerr-Lens Mode-Locked Yb-Doped Yttrium Aluminum Garnet Laser" in Jpn. J. Appl. Phys. 50, 010201 (2011).

METHOD AND LASER PULSE SOURCE APPARATUS FOR GENERATING FS LASER PULSES

FIELD OF THE INVENTION

The present invention relates to a method and a laser pulse source apparatus for generating fs laser pulses by Kerr lens mode-locking. Applications of the invention are available e. g. in the fields XUV generation, MIR generation by intra-pulse difference frequency generation, or spectroscopy with fs laser pulses.

BACKGROUND OF THE INVENTION

In the present specification, reference is made to the following publications cited for illustrating prior art techniques, in particular with regard to generating fs laser pulses by Kerr lens mode-locking:
[1] D. E. Spence et al. in "Opt. Lett. 16, 42-44 (1991);
[2] U. Keller et al. in "Selected Topics in Quantum Electronics, IEEE Journal of 2, 435-453 (1996);
[3] P. F. Moulton et al. in "J. Opt. Soc. Am. B 3, 125-133 (1986);
[4] R. Ell et al. in "Opt. Lett. 26, 373-375 (2001);
[5] M. Tokurakawa et al. in "2008 Conference on Lasers and Electro-Optics & Quantum Electronics and Laser Science Conference, Vols 1-9, 200-201 (2008);
[6] S. Matsubara et al. in "Frontiers in Optics 2008/Laser Science XXIV/Plasmonics and Metamaterials/Optical Fabrication and Testing, OSA Technical Digest (CD) (Optical Society of America, 2008), FTuT1;
[7] S. Matsubara et al. in "Conference on Lasers and Electro-Optics 2010, OSA Technical Digest (CD) (Optical Society of America, 2010), CTuV2;
[8] Y. Sasatani et al. in "International Journal of Latest Research in Science and Technology 1, 2 (2012);
[9] M. Tokurakawa et al. in "Opt. Lett." vol. 33, p. 1380-1382 (2008);
[10] F. Brunner et al. in "Opt. Lett. 27, 1162-1164 (2002);
[11] U. Sadao et al. in "Jpn. J. Appl. Phys. 50, 010201 (2011);
[12] H. A. Haus et al. in "J. Opt. Soc. Am. B 8, 2068-2076 (1991);
[13] V. L. Kalashnikov in "Solid State Laser, P. A. Al-Khursan, ed. (InTech, 2012);
[14] T. Sudmeyer et al. in "Nature Photon." 2, 599-604 (2008);
[15] C. Schriber et al. in "Opt. Express 22, 18979-18986 (2014);
[16] K. F. Mak et al. in "Opt. Lett." 40, 1238, (2015);
[17] O. Pronin et al. in "Nat. Commun." Acc. (2015);
[18] J. Brons et al. in "Opt. Lett." 39, 6442-6445 (2014); and
[19] C. Radzewicz et al. in "Optics Communications", vol. 102, p. 464-468 (1993).

Current applications of laser pulses often require a short pulse duration (broad spectrum). For instance, XUV generation is more efficient when the pulse duration approaches the sub-50 fs regime. Difference frequency generation (DFG) is also desirably performed with a broad spectrum in order to be able to reach broad spectrum in the mid-infrared range. The applications in multiphoton-microscopy, optical coherence tomography also benefit from the short pulses.

The field of ultrafast laser pulse sources (laser oscillators) has experienced dramatic changes over the last two decades. This was mainly due to the development of the mode-locking methods like Kerr-lens mode-locking (KLM) [1] and mode-locking using semiconductor saturable absorber mirrors (SESAM) [2] and their implications in the crystalline solid-state and fiber oscillators [14]. The availability of the relatively cheap and bright diode lasers has prompted the development in Yb, Er, Ho, Tm-doped oscillators (and many other materials) which can be pumped by those diode-lasers. Numerous attempts were made to develop Yb doped materials of a good quality and being able to support pulse durations of about 100 fs (see references in [15]). Many experiments with those materials were concentrated on achieving shortest pulse duration directly from the oscillators. Alternative approaches rely on external spectral broadening and pulse compression performed in solid-core and gas-filled fibers [16] and recently in crystals [17].

There are several important factors which play a crucial role in achieving shortest pulses directly from an oscillator:
a) emission bandwidth of the gain profile of the gain medium,
b) mode-locking technique and its self-amplitude modulation coefficient, relaxation time and starting capability, and
c) dispersion compensation and management (this is especially critical when the pulse duration approaches the few-cycle regime).

Figure 7:
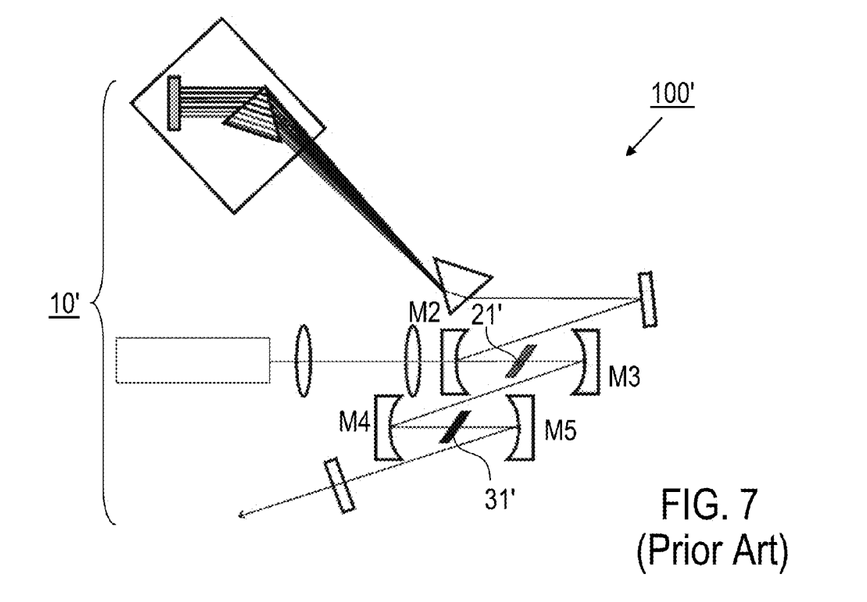
FIG. 7: a schematic illustration of a conventional KLM laser source (prior art).

A broad emission spectrum of the gain medium supports short pulses. An excellent example of an extremely broadband gain medium is Ti-doped Sapphire (Ti:Sa) [3]. FIG. 7 (prior art) illustrates a conventional laser pulse source apparatus 100' as described in [4], which created the shortest pulse duration ever directly achieved from a Ti:Sa oscillator. The laser pulse source apparatus 100' comprises a resonator cavity 10' with a Z-configuration, including the Ti:Sa crystal as a gain medium 21' and Kerr-medium and a BK7 glass plate as additional Kerr medium 31'. However, while the emission spectrum of the Ti:Sa crystal should theoretically support pulses with a duration of about 3 fs, the pulse duration obtained with this setup was 4.8 fs. In other words, the emission bandwidth limit was not reached in [4].

On the other hand, it is possible to generate pulses with a spectrum exceeding the emission bandwidth of the gain medium [5-8]. This fact does not contradict theory and relies on the utilization of nonlinear effects inside of the resonator cavity and soliton mode-locking with rather high coefficients of self-amplitude modulation (SAM). Thus, a spectrum with the full width half maximum (FWHM) of 18.9 nm was generated in a standard Z shape cavity combining both KLM and SESAM techniques [5] for the gain medium $Yb:Lu_2O_3$ which supports only about 13 nm FWHM of the emission profile. The combination of KLM and a SESAM effectively increases the SAM coefficient and leads to a broader spectrum. A similar resonator geometry and the combination of KLM and a SESAM allowed for the generation of 131 fs with a spectral FWHM of 12 nm [8] or an even broader spectrum [6, 9] from an Yb:YAG gain medium (supporting only 9 nm emission spectrum).

However, the SESAM based mode-locking has several disadvantages. Firstly, due to the limited overall bandwidth, the pulse durations obtained with the SESAM techniques are relatively large, e.g. in a range of about 100 fs. Furthermore, SESAM elements are quite expensive, strongly wavelength dependent, exhibit early onset of two-photon absorption, have non-saturable losses and rather low damage threshold. The saturation dynamics of SESAMs leads to additional instabilities as onset of Q-switching. Those critical issues prevent operation at high pulse intensities and average powers.

Mode-locking further can be influenced by spectral filtering as demonstrated in [10, 11]. In the first case [10] filtering is realized via the combination of a prism and a knife edge. In [11], spectral filtering is realized via dielectric mirrors which suppress the gain at its maximum around 1030 nm and also strong reabsorption in a highly-doped Yb:YAG crystal.

Soliton dynamics (mode-locking) is described by complex nonlinear Ginzburg-Landau equation [12, 13]. Depending on the equation simplification used to approximate soliton mode-locking regime different models can lead to the qualitatively different results. For instance, one can completely neglect the self-amplitude modulation (SAM) mechanism or assume perfectly saturable, fast or slow SAM mechanism. However, different models show that SAM coefficient (modulation depth) and its saturation behavior play important role in the mode-locking. For instance, taking the model used in [12] with fast saturable absorber leads to the dependency $$\tau \sim \frac{1}{\sqrt{\Delta R}}$$

where $\tau$ is the pulse duration and $\Delta R$ is SAM coefficient (or:modulation depth). Thus increase in the modulation depth leads to the decrease in the pulse duration. This influence is significant and cannot be neglected.

Due to the shorter pulse durations, there is a particular interest in the KLM-based creation of laser pulses, which however has a limitation due to a pulse intensity dependent saturation and roll-off of the SAM mechanism as described in [13]. FIG. 4 of [13] describes the SAM behavior with a single Kerr medium inside of the cavity. Qualitatively, an increase of intra-cavity power leads to saturation and then roll-off of the power-dependent and artificial intra-cavity losses.

Finally, ultrafast laser pulses can be created by additional spectral broadening and compression, which increase complexity, size and overall costs of the system in conventional laser pulse sources. Furthermore, it may result in additional intensity noise and timing jitter. Applications requiring very clean pedestal-free pulses suffer from the typically bad pulse compression quality with strong pedestal pulses carrying a substantial amount of energy (sometimes up to 50%).

Publication [19] discloses the use of monocrystalline ZnS as an additional highly nonlinear intracavity self-focusing element in a Ti:sapphire self-mode locked laser. A quartz oscillating Brewster plate (OBP) is included in the laser set up, which is used to start mode locking by mechanically oscillating the incidence angle around the Brewster angle only. This mechanical oscillation introduces noise and helps to start mode-locking. When the mode locking is broken, the OBP is used to restore mode locking. According to [19], only the ZnS acts as the additional highly nonlinear intracavity self-focusing element, while there is no idea of using the OBP for self-amplitude modulation or self-focusing.

Objective of the Invention

The objectives of the invention are to provide an improved method and an improved laser pulse source apparatus for generating fs laser pulses based on KLM, which are capable of avoiding disadvantages and limitations of conventional techniques. In particular, the objective is to generate the fs laser pulses with shorter pulse durations, having a spectral bandwidth reaching or exceeding the gain bandwidth, with reduced complexity and size of the laser pulse source apparatus and/or reduced costs.

SUMMARY OF THE INVENTION

The above objectives are solved by a method and a laser pulse source apparatus of the invention.

According to a first general aspect of the invention, the above objective is solved by a method of generating fs laser pulses by KLM, comprising creating a circulating light field (laser beam) in a resonator cavity with multiple resonator mirrors by pumping at least one gain medium included in the resonator cavity and transmitting the circulating light field through a first Kerr medium included in the resonator cavity, so that the fs laser pulses are formed by self-phase modulation, dispersion and self-amplitude modulation of the circulating light field. According to the invention, the resonator cavity includes at least one supplementary Kerr medium enhancing the self-amplitude modulation of the circulating light field. Each of the first Kerr medium and the at least one supplementary Kerr medium provide different non-linear Kerr lens contributions to the self-amplitude modulation of the circulating light field.

According to a second general aspect of the invention, the above objective is solved by a fs laser pulse source apparatus, which comprises a resonator cavity with multiple resonator mirrors spanning a beam path of a circulating light field, wherein at least one gain medium and a first Kerr medium are included in the resonator cavity, said first Kerr medium being arranged for mode-locking the circulating light field and forming the fs laser pulses by self-amplitude modulation of the circulating light field. According to the invention, the resonator cavity includes at least one supplementary Kerr medium being arranged for enhancing the self-amplitude modulation of the circulating light field, wherein each of the first Kerr medium and the at least one supplementary Kerr medium provide different non-linear Kerr lens contributions to the self-amplitude modulation. Furthermore, every Kerr-medium provides certain dispersion and self-phase modulation.

According to the invention, the at least one gain medium, the first Kerr medium and at least one supplementary Kerr medium are included in the resonator cavity. The term "resonator cavity" refers to any arrangement of plane and/or curved cavity mirrors, providing a linear or a ring resonator. The light field circulating along the beam path in the resonator cavity is created within the at least one gain medium, i.e. one single gain medium, e.g. one single solid laser medium, like a laser crystal, or multiple gain media located inside of the resonator cavity. The multiple gain media can be made of the same material or different materials. The gain medium can be in bulk, slab, disk or thin-disk geometry. In all of these configurations the soft aperture of the gain medium is implied. At least one hard aperture, in particular in form of a pinhole or knife-edge, can help to enhance the effect of the distributed Kerr-lenses by introducing losses for spatial modes of the circulating light field.

Contrary to the conventional KLM techniques, the resonator cavity has different Kerr-lens contributions (in particular presented by a parameter K as defined below) of Kerr-media. It does not include the gain medium and one Kerr medium only (like in [4], see present FIG. 7) with nearly the same Kerr-lens contributions, but multiple Kerr media with different Kerr-lens contributions. In the prior art of FIG. 7, both elements Ti:Sa crystal and BK7 plate are Kerr-media. However, the non-linear contributions of both are nearly the same. The beam size in both crystals is approximately the same, as the radius of curvature (ROC) of the focusing mirrors (M2 and M3) for Ti:Sa crystal is equal to the ROC of focusing mirrors M4 and M5 for BK7 plate. Also the thickness of those crystals is nearly the same, 2.7 mm and 2.5 mm correspondingly. Additionally to it the nonlinear refractive indexes $n_2$ for both crystals are quite similar. It means that the Kerr-lens parameter K is nearly the same for both elements.

Preferably, the Kerr media comprise solid, plate-shaped, in particular plan-parallel elements arranged in the beam path of the resonator cavity. The first Kerr medium and the at least one supplementary Kerr medium are arranged with a mutual distance from each other in separate sections of the resonator cavity, i.e. the first Kerr medium is arranged between a first pair of resonator mirrors, and the at least one supplementary Kerr medium is arranged between another pair of resonator mirrors. If multiple supplementary Kerr media are provided, all of them can be arranged between a common second pair of resonator mirrors, or each of them can be arranged between another pair of resonator mirrors. Preferably, the first Kerr medium and the at least one supplementary Kerr medium is arranged in the resonator cavity such that no additional gain is introduced by the Kerr media.

Each of the first and at least one supplementary Kerr media comprises a material having a Kerr nonlinearity ($\chi^3$-nonlinearity). Each Kerr medium is capable of creating a non-linear Kerr lens starting and/or enhancing the self-amplitude modulation of the circulating light field. As a further important feature of the invention, the first and at least one supplementary Kerr media differ from each other in terms of the contribution of each non-linear Kerr lens to the overall self-amplitude modulation in the resonator cavity.

Non-linear Kerr lenses are capable of enhancing the self-amplitude modulation not only with one single set of operation parameters of the Kerr medium in the resonator cavity, like the amount of Kerr nonlinearity of the Kerr medium and geometry and intensity features of the circulating light field, but rather with different ranges of operation parameters. In each range of operation parameters, the circulating light field is mode-locked in a specific way. Accordingly, the term "different non-linear Kerr lens contributions to the self-amplitude modulation" means that each of the Kerr media is adapted for enhancing the self-amplitude modulation of the circulating light field in another range of operation parameters of the Kerr medium in the resonator cavity. In other words, the at least one supplementary Kerr medium introduces a second or further mode-locking mechanism(s) contributing to the self-amplitude modulation and accordingly to the overall mode-locking at other resonator cavity and light field parameters compared with the first Kerr medium.

Advantageously, each Kerr medium is used in an optimum range of operation to influence the self-amplitude modulation, e. g. at somewhat higher intra-cavity intensities, so that the at least one supplementary Kerr media compensates for the roll-off of the first Kerr-medium. The situation becomes more complex when additional supplementary Kerr-media are introduced. Each of these Kerr media makes an additional contribution (effect) to the SAM behavior. In other words, the total SAM mechanism is distributed (cascaded) leading to an effective increase of the SAM coefficient $\Delta R$. The inventors have found that the distributed Kerr lens mode-locking (DKLM) effect can be adjusted or enhanced by choosing appropriate positions for the supplementary Kerr-media within the oscillator cavity along with the choice of material and thickness and optionally also the placement of one or more additional hard aperture(s) inside the cavity.

As the provision of the at least one supplementary Kerr medium allows to increase the modulation depth of KLM, consequently the pulse duration can be shortened, even going beyond the emission bandwidth of the gain medium. With this regard, the term "fs laser pulses" used herein refers to laser pulses having a duration of at most 1000 fs, in particular at most 500 fs or even below 20 fs, down to 10 fs, in particular 5 fs.

As a main advantage of the invention, the fs laser pulses can be created with a bandwidth being equal to or even exceeding the emission bandwidth profile of the at least one gain medium (in particular by at least factor of 2). If multiple gain media are provided in the resonator cavity, the bandwidth of the fs laser pulses can be equal to or exceed the overall bandwidth of all gain media. Accordingly, with a preferred embodiment of the invention, the Kerr lens effects introduced by the first and at least one supplementary Kerr media in the resonator cavity can be selected such that the fs laser pulses are formed with a spectral bandwidth exceeding the overall gain bandwidth of the at least one gain medium. In particular, the material(s) and/or position(s) of the at least one supplementary Kerr medium can be selected and/or adjusted such that the spectral pulse bandwidth exceeds the overall gain bandwidth.

As a further advantage, the DKLM concept presented by this invention shows high average power in combination with the short pulse duration. It represents an extremely attractive alternative to enhancement cavities operating with pulse durations below 50 fs. In this range (<50 fs) dispersion compensation and nonlinear effects in enhancement cavities become extremely crucial and result in enhancement factors of <100 and poor stability of the whole system. For instance, an oscillator running with 1% output coupler transmission has 100 times more power inside of the cavity. Additionally oscillators require no stabilization electronics and can run days and weeks in hands-free mode.

According to a preferred embodiment of the invention, the Kerr lens contribution of each supplementary Kerr medium to the self-amplitude modulation of the circulating light field is weaker than the Kerr lens contribution of the first Kerr medium, so that a build-up of forming the fs laser pulses is obtained by the first Kerr medium. Advantageously, mode-locking of the circulating light field is started by the effect of the first Kerr medium alone, while the at least one supplementary Kerr medium can be adapted for further enhancing the KLM operation.

The at least one supplementary Kerr medium preferably is positioned in the resonator cavity at a location, where the first Kerr medium alone would not be able to start the KLM process. The resonator cavity has at least two resonator sections, wherein the first Kerr medium is arranged in the first resonator section and the at least one supplementary Kerr medium is arranged in the second or further resonator section(s).

The inventors have identified operation parameters of the Kerr medium in the resonator cavity, which are particularly suitable for enhancing the KLM operation. Thus, according to a further preferred embodiment of the invention, the different Kerr lens contributions of each of the first and at least one supplementary Kerr media are provided by selecting different values of at least one of Kerr medium thickness (d) along the beam path in the resonator cavity, Kerr medium nonlinearity ($n_2$) at the center wavelength of the at least one gain medium and laser beam diameter (or:modesize) (w) in the respective Kerr media. With preferred examples, each of the first and at least one supplementary Kerr media can be made of the same material, while the Kerr media are provided with different thicknesses and/or they are located in different sections of the resonator cavity, where different laser beam diameters are formed. With other examples, each of the first and at least one supplementary Kerr media can be made with the same thickness, while the Kerr media are made of different materials and/or they are located in different sections of the resonator cavity, where different laser beam diameters are formed. With yet other examples, each of the first and at least one supplementary Kerr media can be arranged with the same laser beam diameter, while the Kerr media are made of different materials and/or with different thicknesses.

Preferred materials of the Kerr media comprise e.g. Sapphire or YAG. The thickness (d) of the Kerr media is e. g. at least 100 μm, in particular at least 1000 μm, and/or at most 15 mm, in particular at most 5 mm. The laser beam diameter (w) in the first Kerr medium preferably is at least 25 μm, in particular at least 50 μm, and/or at most 1 mm, in particular at most 0.3 mm, and the laser beam diameter (w) in the supplementary Kerr medium/media preferably is at least 160 μm, in particular at least 200 μm, and/or at most 4 mm, in particular at most 2 mm. It is emphasized that these values are examples only, which can be modified by the skilled person in particular in dependency on characteristics of the resonator cavity and the at least one gain medium.

According to a particularly preferred embodiment of the invention, the different Kerr lens contributions of the first and at least one supplementary Kerr media are obtained by selecting different values of a Kerr lens parameter K (or: nonlinear-lens coefficient) of the first Kerr medium and each of the at least one supplementary Kerr medium with $K=(n_2 \cdot d/w^4)$. Advantageously, the Kerr lens parameter K provides a quantitative criterion for self-focusing at each of the Kerr media, and it is independent of power circulating within the resonator cavity.

Different modesizes (laser beam diameters) in the Kerr media are obtained if they are located in sections of the resonator cavity, which are delimited by pairs of resonator mirrors having different reflector shapes and or radii of curvature. The laser beam diameters in the Kerr media can be adjusted by curved or plane shapes of resonator mirrors. Preferably, the laser beam diameter in the first Kerr medium is lower than the laser beam diameter in each of the at least one supplementary Kerr medium. With a preferred example, the first Kerr medium is arranged in a focus between two curved concave resonator mirrors, while the at least one supplementary Kerr medium is arranged between pairs of plane or plane-concave or concave-concave or convex-concave mirrors.

According to the invention, at least one, e.g. one, two, three or even more supplementary Kerr media are arranged in the resonator cavity. Preferably, the resonator cavity includes at least two supplementary Kerr media. Advantageously, this provides more degrees of freedom for enhancing the self-amplitude modulation. Thus, particularly preferred, each of the at least two supplementary Kerr media have different non-linear Kerr lens contributions to the self-amplitude modulation.

According to a further preferred embodiment of the invention, the at least two supplementary Kerr media are arranged in the resonator cavity with a consecutive order such that they provide monotonically changing Kerr lens contributions to the self-amplitude modulation. With preferred examples, the at least two supplementary Kerr media are arranged with monotonically increasing or decreasing thicknesses and/or with monotonically increasing or decreasing laser beam diameters. Advantageously, monotonically changing Kerr lens contributions facilitates a gradual decrease of the pulse duration and the formation of new frequency components.

Advantageously, the invention can be implemented with different gain media, which preferably one or more of the following features. The at least one gain medium can made of e.g. doped YAG (yttrium aluminum garnet), in particular Yb or Ho doped YAG. The at least one gain medium can comprise a thin-disk gain medium, in particular serving as one of the resonator mirrors, and optionally further gain media. Alternatively, the at least one gain medium comprises at least one gain crystal arranged with a distance from the resonator mirrors.

Preferably, the functions of creating the laser beam and mod-locking thereof are fulfilled exclusively by the at least one gain medium and the Kerr media, resp. To this end, the gain medium preferably has such a thickness, that it has no or negligible contribution to the self-amplitude modulation. This condition can be provided e.g. with using a thin disk gain medium, preferably having a thickness below 500 μm, in particular below 150 μm. Furthermore, the laser beam diameter in the gain medium preferably is larger than the laser beam diameter in the first Kerr medium. Preferably, the thin-disk gain medium is used in a multi-pass configuration, i.e. the circulating light field impinges on the disk gain crystal multiple times per cavity round-trip.

According to a further preferred embodiment of the invention, a dispersion control is provided in the resonator cavity, compensating higher order dispersion, in particular second order, third order and/or fourth order, of the Kerr media and the at least one gain medium introduced. A dispersion control device is configured for providing the total value of group delay dispersion (GDD) necessary to start and stabilize the fs laser pulses in the resonator cavity. Furthermore, a CEP control of the fs laser pulses can be provided by positioning an acousto-optic modulator in the resonator cavity. The acousto-optic modulator can be controlled by means of a control loop in dependency on a signal of a pulse monitoring device. Monitoring spectral and/or temporal pulse parameters of the fs laser pulses can be provided for diagnosing the pulses and optionally correcting operation parameters of the Kerr medium in the resonator cavity.

BRIEF DESCRIPTION OF THE DRAWINGS

Further details and advantages of the invention are described in the following with reference to the attached drawings, which show in.

DESCRIPTION OF THE PREFERRED EMBODIMENTS

Features of preferred embodiments of the invention are described in the following with reference to the resonator cavities illustrated in FIGS. 1 to 4. It is noted that the implementation of the invention is not restricted to the resonator cavities illustrated in an exemplary manner. In particular, embodiments of the invention can be modified with regard to the geometry of the resonator cavity, the number of reflector mirrors, the design of reflector mirrors, the number of gain media and the type of gain media. The features of the Kerr media, in particular the thicknesses, non-linear refractive indices and positions thereof can be found empirically by monitoring the created laser pulses, or they can be simulated with the help of ABCD matrices or other numerical beam propagation methods. The features of the at least one gain medium can be selected as known from conventional fs laser pulse oscillators.

Figure 1:
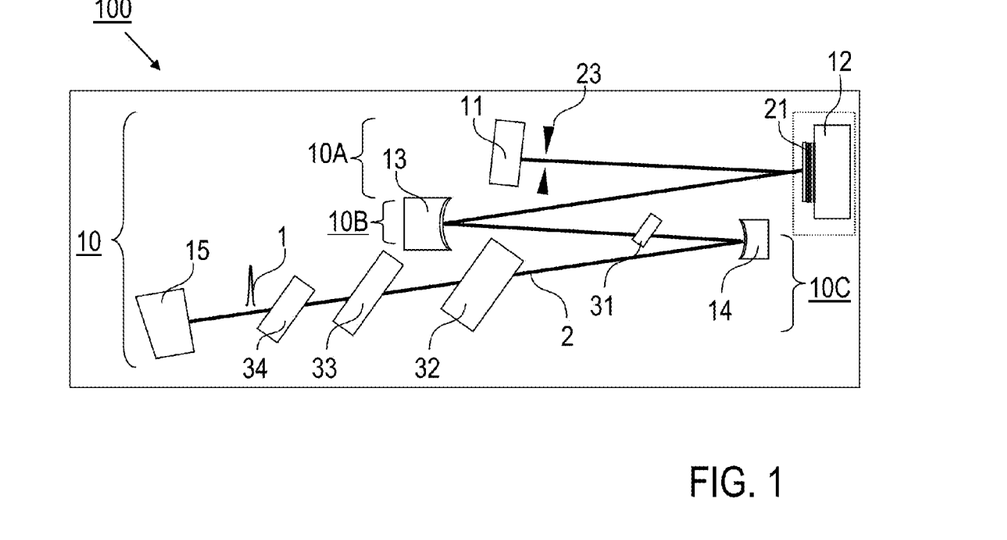
FIGS. 1 to 4: schematic illustrations of resonator cavities of laser pulse source apparatuses according to preferred embodiments of the invention.
Figure 2:
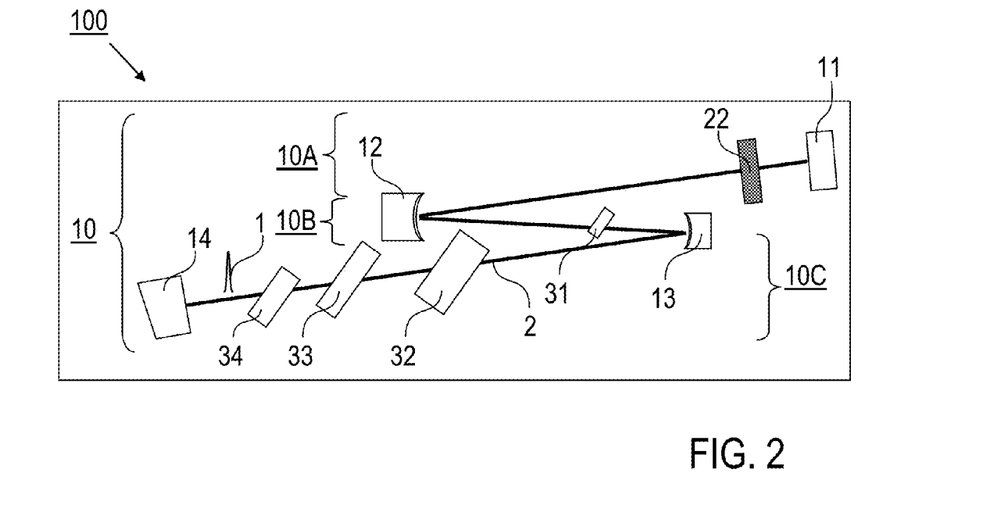
Figure 3:
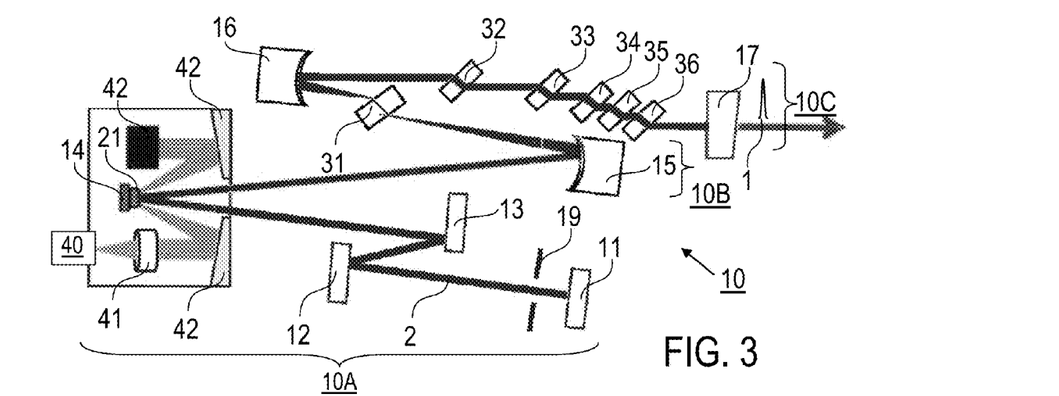
Figure 4:
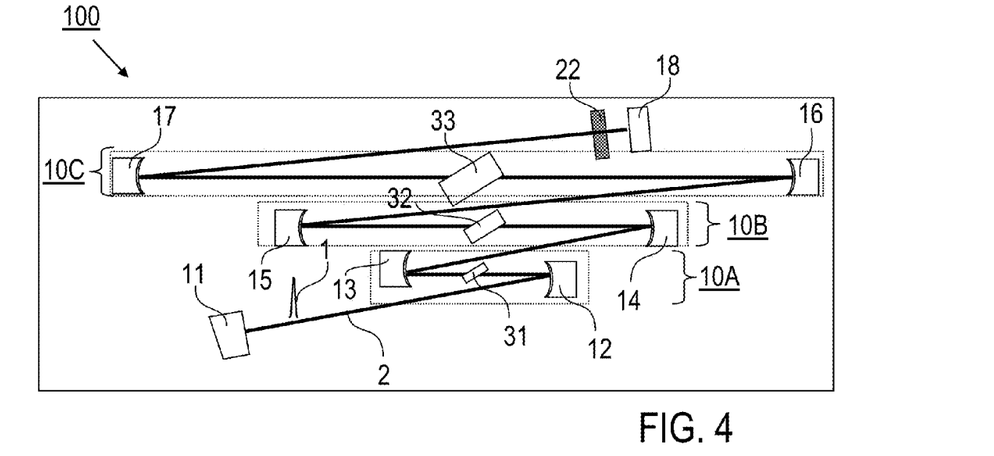

Furthermore, it is noted that FIGS. 1 to 3 illustrate resonator cavities only, while complete laser pulse source apparatuses include additional components, like a laser pump source for pumping the laser process in the gain medium, a dispersion control device, which is adapted for compensating higher order dispersion in the resonator cavity, a CEP control device, which is adapted for adjusting a carrier-envelope-phase relationship of the fs laser pulses, a monitoring device for sensing spectral and/or temporal pulse parameters and a control device for controlling the operation of the laser pulse source device. The laser pump source may comprise one or multiple laser diodes being arranged for irradiating the laser gain medium as shown in FIG. 4 or 7. The dispersion control device comprises an arrangement of optical elements, like moveable mirrors and/or prisms, being arranged for a wavelength dependent dispersion control in the resonator cavity. As an example, the dispersion control device can be provides with two prisms and a plane reflector mirror as illustrated in FIG. 7. The CEP control device comprises for instance an acousto-optic modulator included in the resonator cavity. The monitoring device comprises detector elements and/or optical elements for pulse diagnosis, e.g. by a correlation measurement. An illustration and detailed description of the theses components is illustrated here as they are known as such from conventional techniques.

FIG. 1 illustrates a laser pulse source apparatus 100 with a resonator cavity 10 having a Z-configuration spanning a beam path 2 along resonator cavity sections 10A, 10B and 10C. The resonator 10 is characterized by including a thin disk gain medium 21 and a strong asymmetry in terms of the laser beam diameter in the resonator cavity sections 10A and 10C.

The first resonator cavity section 10A extends between the resonator mirrors 11, 21/12, and 13, and the second resonator section 10B extends from the third resonator mirror 13 to the fourth resonator mirror 14. The first resonator mirror 11 is a plane mirror providing an end mirror of the resonator cavity 10. The second resonator mirror 21 is another plane mirror, which is directly connected with the substrate 12 (serving as a heat sink). The resonator mirror 21 is also a thin disc gain medium (thin-disk laser), wherein the disk has an antireflection coating on the front side and a high-reflection coating on the back side (sometimes called:"active mirror"). The third and fourth resonator mirrors 13, 14 comprise curved concave mirrors with equal or different radii of curvature. Additionally, the first resonator section 11 includes a hard aperture, which has the shape of a pinhole 19 and which introduces predetermined losses for the circulating light field in the resonator cavity 10.

In the resonator arm between the third and fourth resonator mirrors 13, 14, a first Kerr medium 31 is placed, which comprises e.g. a plane-parallel solid plate made of Sapphire and which is arranged with the Brewster angle relative to the beam path 2. The first Kerr medium 31 is placed at or near the focus created by the curved resonator mirrors 13, 14.

The third resonator section 10C extends from the fourth resonator mirror 14 to the fifth resonator mirror 15. The fifth resonator mirror 15 is a plane mirror, which provides the second end mirror of the resonator cavity 10 and simultaneously an out-coupling element for out-coupling laser pulses 1 out of the resonator cavity 10.

The third resonator section 10C includes three supplementary Kerr media 32, 33, 34, each of which comprising a plane-parallel solid plate made of YAG or Sapphire and being arranged with the Brewster angle relative to the beam path 2. The supplementary Kerr media 32, 33 and 34 have stepwise decreasing thicknesses along the order of their arrangement. Simultaneously, due to the laser beam shaping effect of this resonator, the diameter of the laser beam is slightly monotonically decreasing along the beam path 2 from the fourth resonator mirror 14 to the fifth resonator mirror 15. Due to the varying thicknesses of the supplementary Kerr media 32, 33 and 34 and the varying laser beam diameter at the locations of the supplementary Kerr media 32, 33 and 34, each of them introduces a different Kerr nonlinearity to the mode-locking process in the resonator cavity 10. The mirrors 11, 13, 14 and 15 can additionally provide the means of dispersion compensation.

With a practical example, the thin disc gain medium 21 comprises an Yb:YAG disc with a thickness of e.g. 100 μm, which is directly glued on the substrate 12. Both gain medium 21 and substrate 12 form a resonator mirror. By irradiating the thin disc gain medium 21 with pump laser radiation from a laser pump source (not shown), a laser light field is generated in the resonator cavity 10. By the effect of the first Kerr medium 31 and the hard aperture 19, self-amplitude modulation of the circulating laser pulses 1 is introduced. As it is well known in the field of Kerr-lens mode-locked oscillators, mode-locking process can be started by perturbing (pushing) one of the resonator mirrors. The resonator has to be close to the stability edge of its stability zone. Due to the small thickness of the thin disc gain medium 21 and large laser spot size on it (>2 mm diameter) the nonlinearity in the Kerr-media 31-34 is dominant. The laser pulses 1 to be formed require certain self-amplitude modulation as it is known from prior art techniques. However, according to the invention, additional self-amplitude modulation is introduced by the Kerr-lenses of the supplementary Kerr media 32, 33 and 34. With the practical example, 50 fs laser pulses 1 have been directly obtained from the Yb:YAG thin disc gain medium 21 at a central wavelength of 1030 nm (see further experimental details in FIG. 5 below). The first resonator section 10A (from mirror 11 to mirror 13) can also contain additional Kerr-media. Due to the largest spot size (compared to other sections) in the resonator section 10A, the Kerr-nonlinearity contribution would gradually continue to grow. This fact was experimentally verified.

FIG. 2 illustrates an alternative embodiment of the laser pulse source apparatus 100, wherein the resonator cavity 10 is provided with a Z-configuration, including a first resonator section 10A from the first resonator mirror 11 via the second resonator mirror 12 and a second resonator section 10B from mirror 12 to the third resonator mirror 13 and a third resonator section 10C from the third resonator mirror 13 to the fourth resonator mirror 14. The first resonator mirror 11 is a plane high reflective mirror (for the circulating laser radiation), which is arranged for incoupling pumping laser pulses for pumping the laser gain medium 22. With a practical example, the gain medium 22 comprises an Yb:YAG or Ti:sap-phire crystal having a length along the beam path 2 of 5 mm. The second and third resonator mirrors 12, 13 comprise concave curved mirrors with equal or different radii of curvature. In case of different radii of curvature (ROC), namely, ROC of mirror 13 is smaller than the ROC of mirror 12, the laser beam diameter in the section 10C is significantly smaller than the laser beam diameter in the section 10A.

One of the preferable arrangements slightly different from the one shown in FIG. 2 may include additional concave mirror inside of the first section 10A. This would help to decrease the spot size in the gain medium 22. The resonator in FIG. 2 can also be equipped with a hard aperture in the form of pinhole placed in one of the arms of the resonator.

FIG. 3 illustrates another embodiment of the laser pulse source apparatus, wherein the resonator cavity 10 comprises a first resonator section 10A spanned by the first to fifth resonator mirrors 11 to 15 and a second resonator section 10B from the fifth resonator mirror 15 to the sixth resonator mirror 16 and a third section 10C from the mirror 16 to the seventh out-coupling resonator mirror 17. The thin-disk gain medium 21 comprises Yb:YAG with a thickness of about 100 μm, which is glued to the substrate 14.

Pump laser pulses are generated with a laser pump source 40 and focused with imaging optic 41 and imaging reflectors 42 to the thin-disk gain medium 21 for pumping the laser gain medium and consequently creating the laser beam in the resonator cavity 10. A circulating light field is generated in the resonator cavity 10, and by the action of the first Kerr medium 31 together with the hard aperture 19, self-amplitude modulation is provided thus initiating laser pulses 1. The second resonator section 10B includes one Kerr medium 31. The third resonator section 10C includes five supplementary Kerr media, including supplementary Kerr medium 32 made of sapphire with a thickness of 5.5 mm, supplementary Kerr medium 33 made of YAG with a thickness of 3 mm, and three supplementary Kerr media 34, 35 and 36, each being made of sapphire with a thickness of 3 mm. By the effect of the supplementary Kerr media, the self-amplitude modulation of the circulating laser pulses 1 is enhanced. The mirrors 13 and 12 are dispersive mirrors for dispersion compensation.

FIG. 4 illustrates another embodiment of the laser pulse source apparatus 100 with a resonator cavity 10 having multiple foci inside, including three main distinguished sections, a first resonator section 10A, a second resonator section 10B and a third resonator section 10C. With this embodiment, the first resonator section 10A is formed by curved mirrors 12 and 13. The first resonator mirror 11 is a plane out-coupling end mirror, while the second and third resonator mirrors 12, 13 comprise concave curved mirrors creating a focus there between where the first Kerr medium 31 is arranged. The second resonator section 10B is spanned by the curved mirrors 14 and 15. The gain medium 22 comprises a laser crystal, like e.g. Yb:YAG or Ti:sapphire or Ho:YAG, having a length along the beam path 2 of 5 mm, which is arranged close to the plane end mirror 18.

With the embodiment of FIG. 4, two supplementary Kerr media 32, 33 are provided between the mirror pairs 14/15 and 16/17, respectively. The supplementary Kerr media 32, 33 have different thicknesses of e.g. 3000 μm and 6000 μm. With the radii of curvature of the mirror pairs 14/15 and 16/17, the laser beam diameters within the supplementary Kerr media 32, 33 is adjusted.

In practical operation, the KLM process is started by the effect of the first Kerr medium 31. The laser beam diameters, Kerr media thicknesses and nonlinear reflective indices of the supplementary Kerr media 32, 33 are selected differing from the corresponding features of the first Kerr medium 31, so that the Kerr-lens mode-locking effect from every Kerr medium sums up to a total effect of the Kerr-lens. The cumulative effect of the Kerr-lenses of every supplementary Kerr media increases the self-amplitude modulation in the resonator cavity and improves the total mode-locking effect.

Figure 5:
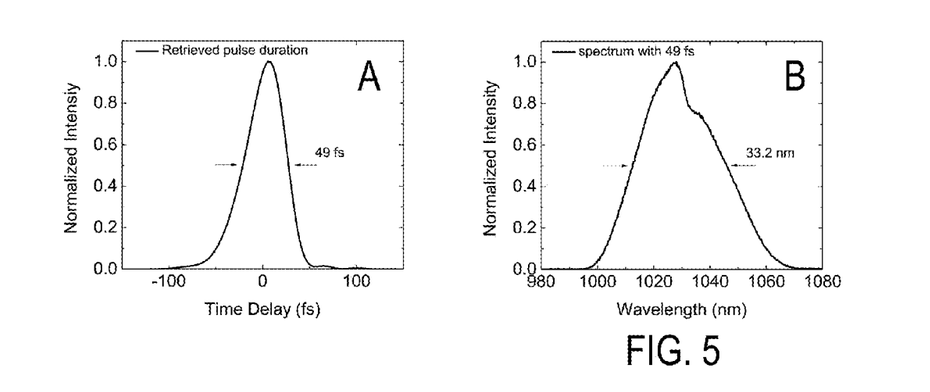
FIGS. 5 and 6: graphical representations of experimental results obtained with the inventive method of generating fs laser pulses.

FIG. 5 illustrates experimental results obtained with the embodiment of FIG. 1. According to FIG. 4A, a pulse duration of 49 fs has been measured with a frequency resolved optical gating (FROG) technique. Furthermore, the spectrum of the 49 fs laser pulses as shown in FIG. 4B shows a 33 nm FWHM, which is directly generated from the thin disc gain medium 21 by implementing the inventive concept of distributed KLM. With a fluorescence bandwidth of the thin disc material Yb:YAG of 9 nm at FWHM, the fs laser pulses have a bandwidth exceeding the bandwidth of the gain medium.

Figure 6:
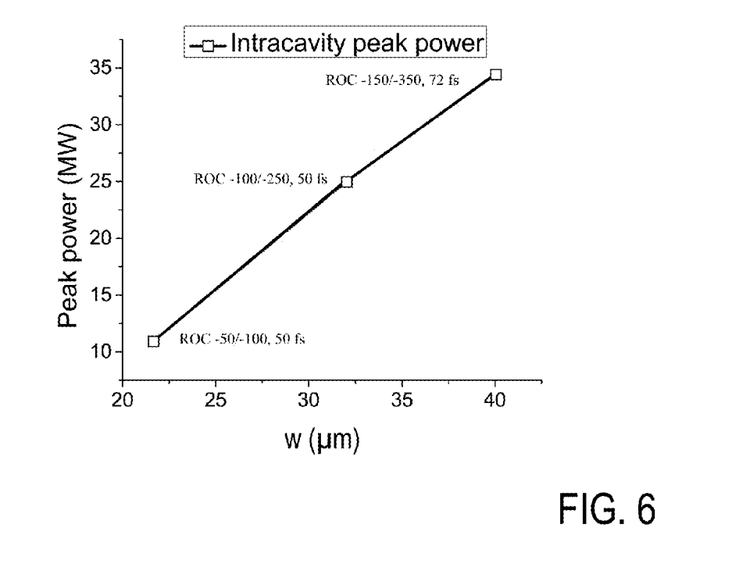

FIG. 6 illustrates that the intracavity peak power of the resonator cavity according to FIG. 1 can be increased by increasing the radii of curvature of the resonator mirrors 13 and 14 (see FIG. 1) and by proportionally increasing the distance between all the mirrors inside of the cavity. In other words, by geometrically scaling the resonator. The x-axis of FIG. 5 shows the laser beam radius w inside the first Kerr medium 31 that was adjusted by changing the radii of curvature ROC (μm) of mirrors 13, 14 and distances in three resonator sections.

The features of the invention disclosed in the above description, the drawings and the claims can be of significance both individually as well as in combination or subcombination for the realization of the invention in its various embodiments.

What is claimed is:

1. A method of generating fs laser pulses in a resonator cavity including multiple resonator mirrors, at least one gain medium and a first Kerr medium, comprising the steps of creating a circulating light field in the resonator cavity with the multiple resonator mirrors by pumping the at least one gain medium, and passing the circulating light field through the first Kerr medium included in the resonator cavity, so that the fs laser pulses are formed by self-amplitude modulation of the circulating light field, wherein the resonator cavity further includes at least one supplementary Kerr medium enhancing the self-amplitude modulation of the circulating light field, wherein each of the first Kerr medium and the at least one supplementary Kerr medium provides different nonlinear Kerr lens contributions to the self-amplitude modulation of the circulating light field.

2. The method according to claim 1, wherein the Kerr lens contribution of each of the at least one supplementary Kerr medium to the self-amplitude modulation of the circulating light field is weaker than the Kerr lens contribution of the first Kerr medium, so that a build-up of forming the fs laser pulses is obtained by the first Kerr medium.

3. The method according to claim 1, wherein the different Kerr lens contributions of the first and at least one supplementary Kerr media are provided by selecting different values of at least one of Kerr medium thickness (d), Kerr medium nonlinearity ($n_2$) and laser beam diameter (w) in the first Kerr medium and each of the at least one supplementary Kerr medium.

4. The method according to claim 3, wherein
the different Kerr lens contributions of the first and at least one supplementary Kerr media are designed by selecting different values of a Kerr lens parameter ($n_2 \cdot d/w^4$) of the first Kerr medium and each of the at least one supplementary Kerr medium.

5. The method according to claim 3, wherein
the laser beam diameter (w) in the first Kerr medium is lower than the laser beam diameter (w) in each of the at least one supplementary Kerr medium.

6. The method according to claim 1, wherein
the resonator cavity includes at least two supplementary Kerr media, wherein
each of the at least two supplementary Kerr media have different non-linear Kerr lens contributions to the self-amplitude modulation.

7. The method according to claim 6, wherein
the at least two supplementary Kerr media are arranged in the resonator cavity with a consecutive order such that they provide monotonically changing Kerr lens contributions to the self-amplitude modulation.

8. The method according to claim 1, wherein the at least one gain medium has at least one of the features
the at least one gain medium is made of doped YAG,
the at least one gain medium is selected such that it has no or negligible contribution to the self-amplitude modulation,
the at least one gain medium is a thin-disk gain medium, and
the at least one gain medium is a gain crystal arranged with a distance from the resonator mirrors.

9. The method according to claim 1, further including at least one of
dispersion control in the resonator cavity, compensating higher order dispersion of the Kerr media and the at least one gain medium introduced and providing total value of group delay dispersion (GDD) necessary to start and stabilize fs pulses,
a hard-aperture introduces losses for the circulating light field,
CEP control of the fs laser pulses by an acousto-optic modulator included in the resonator cavity, and
monitoring spectral and/or temporal pulse parameters of the fs laser pulses.

10. The method according to claim 1, wherein
at least one gain medium comprises a thin-disk gain medium, and
the thin-disk gain medium is used in a multi-pass configuration.

11. The method according to claim 1, wherein
the first and at least one supplementary Kerr media are arranged such that the fs laser pulses are formed with a spectral bandwidth exceeding an overall gain bandwidth of the at least one gain medium.

12. A laser pulse source apparatus, configured for generating fs laser pulses, comprising
a resonator cavity with multiple resonator mirrors spanning a beam path for a circulating light field,
at least one gain medium included in the resonator cavity, and
a first Kerr medium included in the resonator cavity, said first Kerr medium being arranged for forming the fs laser pulses by self-amplitude modulation of the circulating light field, wherein
the resonator cavity further includes at least one supplementary Kerr medium being adapted for enhancing the self-amplitude modulation of the circulating light field, wherein
each of the first Kerr medium and each of the at least one supplementary Kerr medium is arranged for providing different non-linear Kerr lens contributions to the self-amplitude modulation.

13. The laser pulse source apparatus according to claim 12, wherein
the Kerr lens contribution of each of the at least one supplementary Kerr medium to the self-amplitude modulation of the circulating light field is weaker than the Kerr lens contribution of the first Kerr medium, so that a build-up of forming the fs laser pulses is obtained by the first Kerr medium.

14. The laser pulse source apparatus according to claim 12, wherein
the first Kerr medium and each of the at least one supplementary Kerr medium have different values of at least one of Kerr medium thickness (d), Kerr medium nonlinearity ($n_2$) and laser beam diameter (w) in the first Kerr medium and each of the at least one supplementary Kerr medium.

15. The laser pulse source apparatus according to claim 14, wherein
the first Kerr medium and each of the at least one supplementary Kerr medium have different values of a Kerr lens parameter ($n_2 \cdot d/w^4$).

16. The laser pulse source apparatus according to claim 14, wherein
the resonator cavity and the Kerr media are configured such that the laser beam diameter (w) in the first Kerr medium is lower than the laser beam diameter (w) in the at least one supplementary Kerr medium.

17. The laser pulse source apparatus according to claim 12, wherein
the resonator cavity includes at least two supplementary Kerr media, wherein
each of the at least two supplementary Kerr media is arranged for providing different non-linear Kerr lens contributions to the self-amplitude modulation.

18. The laser pulse source apparatus according to claim 17, wherein
the at least two supplementary Kerr media are arranged in the resonator cavity with a consecutive order such that they provide monotonically increasing Kerr lens contributions to the self-amplitude modulation.

19. The laser pulse source apparatus according to claim 12, wherein the at least one gain medium has at least one of the features
the at least one gain medium is made of doped YAG,
the at least one gain medium is selected such that it has no or negligible contribution to the self-amplitude modulation,
the at least one gain medium is a thin-disk gain medium, and
the at least one gain medium is a gain crystal arranged with a distance from the resonator mirrors.

20. The laser pulse source apparatus according to claim 12, wherein
the first and at least one supplementary Kerr media are arranged such that the fs laser pulses are formed with a spectral bandwidth exceeding an overall gain bandwidth of the at least one gain medium.

* * * * *